United States Patent [19]

Wield et al.

[11] Patent Number: 4,760,752
[45] Date of Patent: Aug. 2, 1988

[54] PLASTIC DEFORMATION RELIEF

[75] Inventors: Paul J. Wield; Curt N. Torgerson, both of San Diego, Calif.

[73] Assignee: Hewlett-Packard Company, Palo Alto, Calif.

[21] Appl. No.: 33,318

[22] Filed: Apr. 1, 1987

[51] Int. Cl.$^4$ .................. F16H 55/10; B23P 19/02
[52] U.S. Cl. ........................ 74/434; 29/525; 74/DIG. 10; 403/282; 403/383
[58] Field of Search ............ 74/434, 553, DIG. 10; 29/525; 403/282, 383

[56] References Cited

U.S. PATENT DOCUMENTS

| | | | |
|---|---|---|---|
| 3,679,252 | 7/1972 | Howie, Jr. | 403/383 X |
| 3,783,708 | 1/1974 | Witkowski | 74/553 |
| 3,872,578 | 3/1975 | Ullom | 29/525 |
| 3,880,536 | 4/1975 | Petrus | 403/383 X |
| 3,994,608 | 11/1976 | Swiderski | 74/553 X |
| 4,295,246 | 10/1981 | Howie, Jr. | 74/553 X |

Primary Examiner—Allan D. Herrmann
Attorney, Agent, or Firm—Eugene H. Valet

[57] ABSTRACT

A part, providing its own plastic deformation method and an exemplary embodiment, a polycarbonate spur gear, is disclosed. In a part having at least one region adapted to be deformed due to press-fit forces acting upon said region deformation is decoupled from proximate critical surfaces by providing at least one aperture in said part in a second region which is spaced from said first region in the general direction of the resultant vector of said forces such that said deformation is relieved by said aperture.

In its basic aspects, an exemplary embodiment of the present invention, a plastic spur gear which remains rotationally concentric by embodying the inventive concept is described.

7 Claims, 2 Drawing Sheets

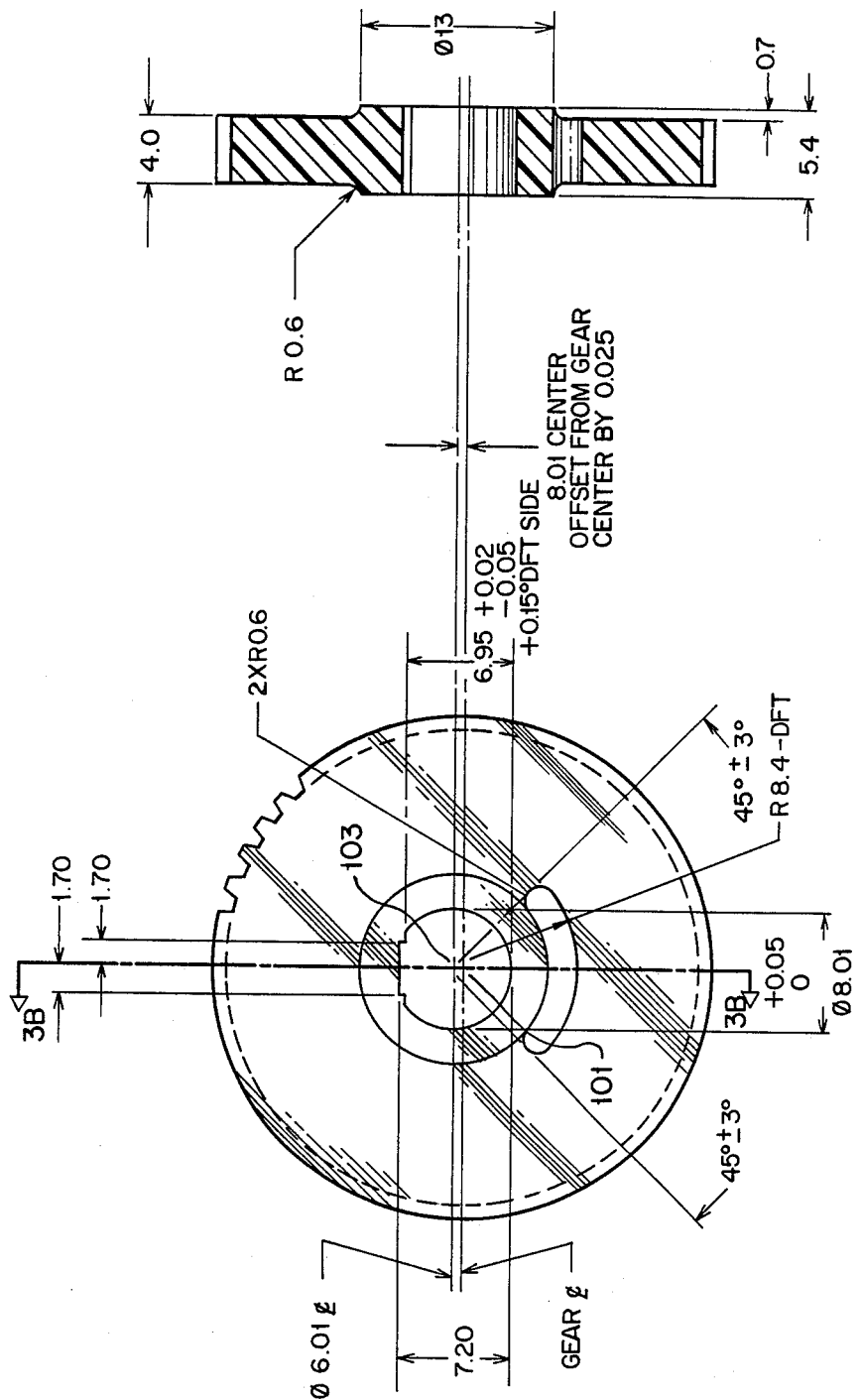

PLASTIC DEFORMATION RELIEF

BACKGROUND OF THE INVENTION

1. Field of the Invention

The present invention generally relates to plastic materials and articles of manufacture and, more particularly, to a method for providing relief for interference press-fit type deformation and an exemplary device incorporating such plastic deformation relief.

2. Description of the Related Art

Molding technology advances in the field of materials having plastic properties have resulted in many articles of manufacture which now unite components by press-fitting them together when one or more of the components is fabricated of such a plastic material. By definition, stress and strain forces exerted on the material during such press-fitting cause deformation of the plastic material which thereby allows a relatively tight connection.

For example, advances in molding technologies have allowed molded gears, e.g. of hard plastic, to replace machined gears and, thereby, substantially reduce product costs. As other examples, irregulars cams, normally shaft-mounted disks (such as flywheels, disk brake rotors, and clutch plates), and even popular children's construct-it-yourself toys use press-fit parts. For the purpose of describing the inventive concept disclosed, an example of a spur gear having integral deformation relief features will be used in this specification. This is not intended by the inventors to express or imply any limitation on the concept.

It is well-known that hobbed metal gears can be mounted on a shaft by simple pressing. Machining such gears and their respective shafts allows very tight tolerances to be achieved. The gear mount hole may or may not have features, such as knurls, to mate with complementary shaft features in order to prevent slippage.

A problem with press-fit plastic gears is how to mount the gear on a shaft in such a way as not to disturb the concentricity of the gear to the shaft rotational axis and yet achieve a tight tolerance in order to prevent slippage. An eccentricity will cause angular transmission error—which is important if positional accuracy is required. Furthermore, an eccentric gear of a plastic material may not transmit torque properly and may quickly be worn out.

In the prior art, it is generally known to have a gear mount hole which is D-shaped with a close tolerance to the cross-section dimensions of a D-shaped shaft. The gear is then often secured with E-rings or screws. The problem with such a mounting technique is that close tolerances available in the machining of metal gears are difficult to achieve with current molding technologies. If the gear mount hole is slightly smaller than the shaft, some deformation will still exist once the gear is pressed onto the shaft. Holding screws for oversized shaft holes can also create unwanted deformations and resultant eccentricities.

Hence, there is a need for a method of relieving deformation in interference press-fit parts.

With respect to the exemplary embodiment, there is a need for an economical, plastic-material gear which can be mounted on a shaft in such a way as not to disturb the concentricity of the gear to the shaft rotational axis and yet still be able to accurately position and transmit the torque required.

SUMMARY OF THE INVENTION

In a basic aspect, the present invention provides a part having at least one region adapted to be deformed due to press-fit forces acting upon said region by providing at least one aperture in said part in a second region which is spaced from said first region in the general direction of the resultant vector of said forces such that said deformation is relieved by said aperture.

In its basic aspects, an exemplary embodiment of the present invention provides a deformation-compensating interference press-fit part, including at least one deforming means for attaching said part by press-fit forces acting upon at least one region of said deforming means such that said attaching provides a tight coupling; and compensating means, in proximity to said one region in the general direction of a resultant vector of said press-fit forces, for compensating deformation caused by said forces.

It is an advantage of the present invention that it provides automatic decoupling of interference press-fit deformation from critical surfaces of plastic parts.

It is another advantage of the present invention that it provides a way to mount plastic, disk-like components, e.g. gears, securely on a shaft without the aid of secondary holding mechanisms.

Yet another advantage of the present invention is that it provides a plastic gear which automatically compensates periphery deformation caused by insertion of a shaft through a shaft hole in the body of the gear.

A further advantage of the present invention is that it requires lower tolerance requirements for shaft hole dimensions in the molding process.

Other objects, features and advantages of the present invention will become apparent upon consideration of the following detailed description and the accompanying drawings, in which like reference designations represent like features throughout the FIGURES.

BRIEF DESCRIPTION OF THE DRAWINGS

FIGS. 3A and 3B are plan views of an exemplary model of a gear fabricated in accordance with the present invention, showing dimensions conforming the model to the basic aspects of the present invention in which:

FIG. 3A is a plan view (face), and

FIG. 3B is a plan view (side) taken along plane 3B—3B as shown in FIG. 3A.

The drawings referred to in this description should be understood as not being drawn to scale except if specifically noted.

DETAILED DESCRIPTION OF THE INVENTION

Reference is made now in detail to a specific embodiment of the present invention, which illustrates the best mode presently contemplated by the inventor(s) for practicing the invention. Alternative embodiments are also briefly described as applicable. For this description, the gear is assumed to be molded of a relatively hard plastic, e.g. polycarbonate plastic.

Figure 2:
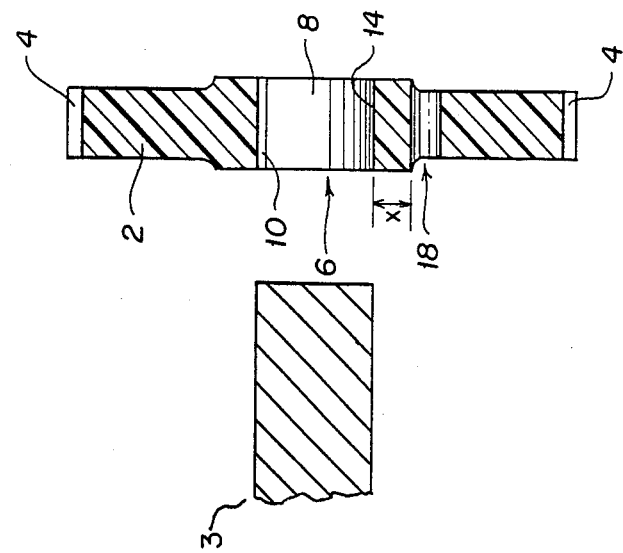
FIG. 2 is a plan view (side) of the present invention taken along plane 2—2 as shown in FIG. 1.
Figure 1:
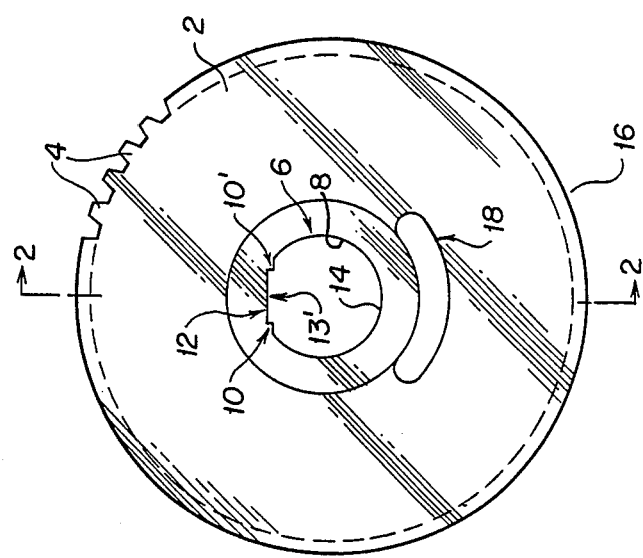
FIG. 1 is plan view (face) of a gear designed according to the present invention.

Referring now to FIGS. 1 and 2, the spur gear of the present invention is shown to have a substantially circular body 2. A series of teeth 4 is radially disposed about the complete periphery of the body 2. An aperture 6 is provided for receiving a shaft 3. The aperture 6 defines an interior wall 8 within the gear body 2. As is known in the art, such an aperture, or shaft hole, 6 would generally be substantially circular or D-shaped to accommodate a particular shaft cross-sectional shape (although almost any geometrical shape can be used).

Projections 10, 10' from wall 8 make an incursion into the aperture 6. In this preferred embodiment, the projections 10, 10' are designed to interfere with the insertion of a D-shaped shaft. As the gear is pressed onto such a shaft, the projections 10, 10' are deformed by the shaft end. Being formed of plastic, a springback occurs. Using standard engineering analysis, the projections 10, 10' can be dimensioned to springback so as to preload the shaft.

Between the projections 10, 10', an optional, separate, flat face projection 12 into the aperture from wall 8 forms a plastic-flow relief region 13' within the aperture 6. In other words, plastic can flow from the projections 10, 10' into the relief region 13' during the deformation. The relief region 13 must be small enough to not allow the deformation of the projections 10, 10' due to shaft rotatation within the gear hole 6 when maximum torque is applied. Therefore, it is necessary to establish a proper height dimension based upon standard engineering analysis of relative sizes and the flow parameters of the particular plastic material used in fabricating the gear. The width of the relief region 13' is inversely proportional to the force required to press-fit onto the shaft.

Conversely, aperture 6 as shown in FIG. 1 can be considered as being D-shaped and having a recess as the relief region 13 in the approximate center of the flat region of the D-shape.

Similarly, the inside diameter of the aperture 6 should be proportioned with respect to a shaft cross-section such that after deformation, the shaft establishes at least point contact with wall 8 at least at the projections 10, 10' and an area 14 of wall 8 opposite said projections 10, 10' and, preferably, also relief region 13. In order to ensure such contact is established, an offset of the center axis of aperture 6 inner diameter with respect to the center of the body 2 outer diameter can be provided. In other words, the amount of clearance for the shaft to wall 8 is built into the offset of the inner diameter center axis 101 to the outer diameter center axis 103 such that the outer diameter remains concentric to the shaft. Too large a clearance would move the shaft away from the projections 10, 10' and push it offcenter of the outer diameter.

As will be recognized by a person skilled in the art, the forces involved in the contact points, the two projections 10, 10' and the opposite wall area 14, tend to deform the periphery 16 of the gear. (In a different type component embodying the concept, the critical surface for which deformation is to be prevented may be other than a periphery, e.g. an adjacent press-fit socket or tab region.) Therefore, a means for relieving this periphery deformation is provided to decouple force vectors from the periphery 16. An aperture 18 through the gear body 2 proximately spaced adjacently from area 14 provides this decoupling effect. The shape of aperture 18 and dislocation distance of aperture 18 from wall area 14 will affect the amount of force decoupled. In general, the aperture 18 is located in the part in the general direction of the resultant vector of the forces. Thus, depending on the particular application, the interference of the projections and the amount of relief must be adjusted in accordance with these features of the aperture 18.

In the gear exemplary embodiment, the aperture 18 defines an arc of a circle having an inner radius greater than said central mounting aperture radius.

As shown in FIG. 2, the distance between the wall region 14 and the aperture 18, labelled x, is determinative of the quantity of force which will be compensated relative to the tightness of the press-fit. This will also be dependent on the physical deformation characteristics of the material of which the part is fabricated.

Through use of the exemplary embodiment described, it has been shown that relief for deformation in a part having at least one region adapted to be deformed due to press-fit forces acting upon said region can be decoupled from a critical surface by providing at least one aperture in said part in a second region which is spaced from said first region in the general direction of the resultant vector of said forces.

In operation, no substantial loosening occurs using the gear of the present invention. Hence, it has been found that the deformation fits the shaft to the aperture more precisely than plastic molding tolerances would allow.

EXAMPLE

A gear fabricated in accordance with the principle features of the present invention is shown in FIGS. 3 and 3a.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A press-fit part having a substantially circular body having a substantially circular, central aperture for receiving a shaft therethrough and defining an inner aperture wall, comprising:

deforming means, projecting inwardly from one semicircle region of said wall, for deforming upon insertion of said shaft; and compensating means in said body, in radially-spaced proximity to a region of said wall which is substantially diametrically opposing said one semicircle wall region, for relieving deformation of said body caused by said shaft, wherein the rotational center axis of said body is offset from the geometrical center rotational axis of said body toward said compensating means such that said part rotates concentrically to said shaft's rotational axis.

2. The part as set forth in claim 1, wherein said aperature has an inner diameter such that said shaft contacts said inner aperture wall as least on said deforming means and at a point of said opposing semicircle wall region diametrically opposite said relieving means.

3. The part as set forth in claim 1, wherein said compensating means defines a second aperture in said body.

4. The part as set forth in claim 3, wherein said second aperture defines an arc of a circle having an inner radius greater than said central mounting aperture.

5. The part as set forth in claim 4, wherein said part is molded of a polycarbonate plastic material.

6. A spur gear for mounting on a shaft, comprising:
a deformable body portion;
a first aperture, having a center axis which is centrally located through said body portion, for receiving said shaft, forming a D-shaped inner aperture wall having a substantially central recess in the flat of said D-shaped wall; and
a second aperture through said body portion, dislocated from said first aperature diametrically opposing said flat of said D-shape, wherein said first aperture has a center which is offset toward said second aperture with respect to the geometric center of said body portion such that regardless of deformation caused by inserrtion of said shaft through said first aperture, said gear rotates concentrically to said shaft means rotational axis.

7. The gear as set forth in claim 6, wherein said second aperature defines an arc of a circle having a radius greater than radius of the curve of said D-shaped wall.

* * * * *